Dec. 27, 1955  W. VAN GUILDER  2,728,368
GRATER AND SLICER ATTACHMENT FOR FOOD MIXER
Filed Feb. 10, 1950
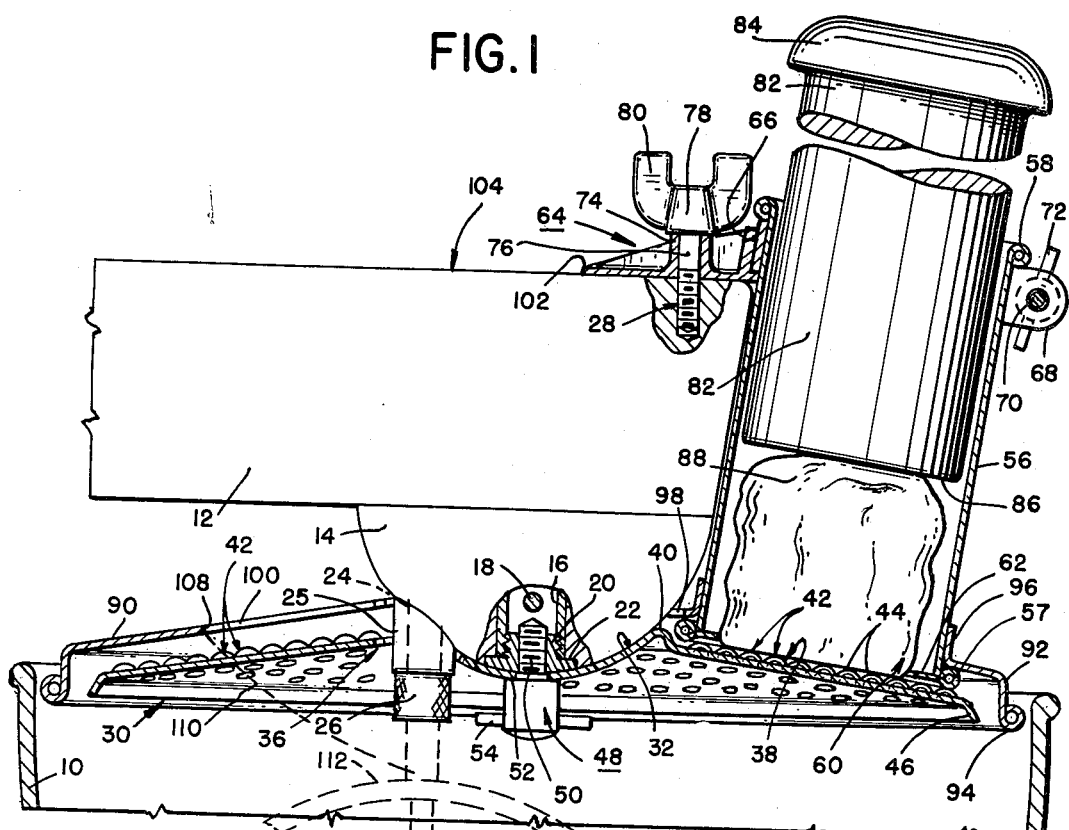
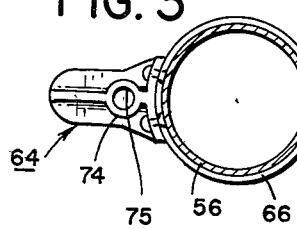
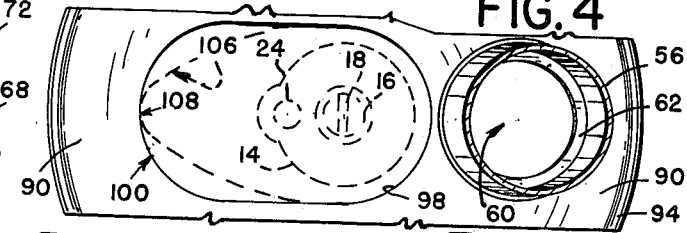
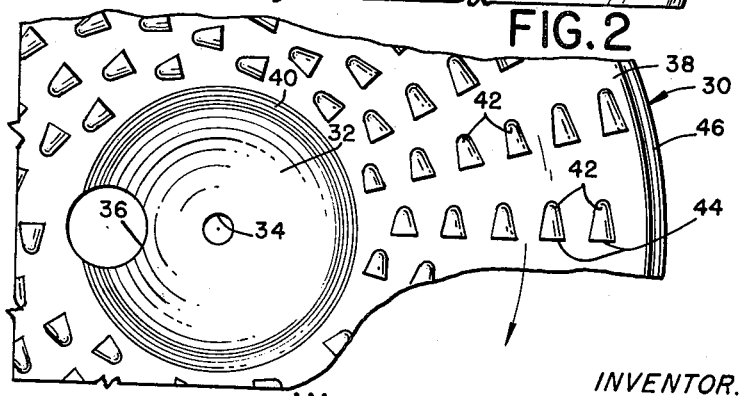
INVENTOR.
WALTER VAN GUILDER
BY William C. Babcock
ATTORNEY United States Patent Office 2,728,368
Patented Dec. 27, 1955

2,728,368

GRATER AND SLICER ATTACHMENT FOR FOOD MIXER

Walter Van Guilder, River Forest, Ill., assignor to General Mills, Inc., a corporation of Delaware Application February 10, 1950, Serial No. 143,382

8 Claims. (Cl. 146—177)

The present application is related to food mixers, and more particularly to an improvement in the arrangement and mounting of various accessory devices on a mixer of the planetary type.

Household food mixers are well known in which a power unit or gear casing is located above a mixing bowl and is provided with a planetary mixing head on its under side. The mixing head itself is rotatably mounted on the casing for rotation around a substantially vertical axis, and carries an offset planetary beater shaft which rotates on its own axis and at the same time revolves around the axis of revolution of the mixing head. It has been customary, in connection with such mixers, to provide alternate power takeoffs at various points on the gear casing such as, for example, the front end or top of the casing. Only a few attempts have been made to utilize the mixing head itself, or the axial shaft which drives such head, as a power source for use with various accessories.

It is accordingly one object of the present invention to provide an improved household food mixer of the planetary type, in which provision is made for attachment of accessories to the mixing head itself.

Another object is the provision of such a mixer with improved means on the planetary head for rigid attachment of an accessory in driving engagement with the head.

A further object is the provision of an improved food slicer and grater attachment for such a mixer.

Another object is the provision of a food cutting attachment for such a mixer in which a cutting member is mounted directly on the planetary mixing head while a separate feed hopper is supported on a stationary portion of the casing spaced from the head.

A still further object is the provision of such a mixer in which a feed hopper mounted at a stationary part of the casing is provided with a guard plate for cooperation with a food cutting member attached to the planetary head of the mixer.

Other objects and advantages of the present invention will be apparent from the following specification in which a preferred embodiment of the invention is described with particular reference to the accompanying drawings.

In these drawings, wherein like reference characters indicate like parts,

Figure 1 is a side elevation, with certain parts shown in section, of a portion of a planetary type mixer in combination with a food cutting attachment according to the invention.

Fig. 2 is a fragmentary plan view of the food cutting attachment member of Fig. 1.

Fig. 3 is a top view with parts in section of the clamp by which the feed hopper and guard plate of Fig. 1 are supported, and Fig. 4 is a fragmentary top view of the guard plate and hopper with the bracket removed.

As shown in Fig. 1, the mixer according to the present invention includes a mixing bowl 10, above which is located a power unit or gear casing 12. The mixer includes a suitable electric motor (not shown) which is connected by driving means within the casing 12 to actuate a mixing head 14 rotatably mounted on the lower side of casing 12. In this case, the mixing head 14 rotates about a substantially vertical axis and is mounted on and carried by a tubular vertical shaft 16 to which the head 14 is keyed by a cross pin 18. The lower end of tubular shaft 16 is internally threaded for receipt of a threaded cap or retaining member 20, which has a projecting shoulder 22 overlapping a portion of the lower end of the mixing head 14 to hold the latter firmly on shaft 16.

A planetary beater shaft 24 is rotatably mounted in the hub 25 on the mixing head 14 for rotation about a vertical axis which is laterally offset from the axis of shaft 16. Planetary shaft 24 carries a clamping member 26 for removable attachment of a beater 112 in known manner. This general type of mixer construction is well known in the art and it will be readily understood that the internal gearing and power connections are such that when the motor is energized, the vertical shaft 16 and mixing head 14 will rotate in one direction, while the planetary shaft 24 will be rotated in the opposite direction while at the same time it revolves around the axis of shaft 16.

The mixer casing 12 is also provided with separate attaching means for connection of various accessories to the device. In this case, the separate attachment means is located in the upper or top wall 104 of casing 12 and includes an internally threaded socket or recess 28 which is accessible from the top of the casing.

According to the present invention, a suitable accessory such as a slicer, grater, or other food handling device, is mounted directly and rigidly on the planetary mixing head 14 for rotation with the head. By way of illustration, a grater plate or slicer 30 has been shown. This member 30 includes a central bearing portion 32 which is shaped to fit the lower portion of mixing head 14. Thus the bearing portion 32 is substantially cup shaped or spherically concave in order to fit the spherical surface of the mixer head 14. This bearing portion 32 is provided with means for attachment to the mixer head which in this case includes a central or axial opening 34.

Member 30 also includes means for engagement with the planetary beater shaft hub 25 so that the engagement of such means against the hub will result in rotation of the operating device 30 with the mixer head 14.

In the present case, the means for engagement with the hub 25 includes an offset opening 36 through which the hub 25 may project when the food cutting member 30 is mounted on the planetary head 14 as shown in Fig. 1. Immediately adjacent the central bearing portion 32 the memebr 30 includes a food cutting surface which in this case extends in the form of a relatively flat conical section. This food cutting surface 38, by reason of its conical shape, is relatively rigid and capable of resisting deformation under the operating conditions encountered when used in combination with the mixer. Between the central bearing portion 32 and food cutting surface 38, the member 30 is beaded as indicated at 40 for added strength.

The cutting surface itself includes a number of raised portions 42 which are struck up from the surface 38 so as to provide cutting edges 44. These embossed or struck up portions 42 and their respective cutting edges 44 are arranged in staggered formation so that during rotation of food cutting member 30 there will be effective cutting surfaces throughout the area between the beaded portion 40 and the edge of the cutting member 30. The outer edge 46 of the cutter 30 is formed as a depending flange to strengthen the rim of the device.

In order to mount the cutting member 30 rigidly on the mixing head 40, a separate fastening or retaining member 48 is provided. Member 48 thus constitutes means for attachment of the member 30 to the mixing head. This retaining member or bolt 48 includes a relatively narrow threaded shaft portion 50 which may be screwed into the internally threaded axial opening of the shaft end cap 20. The threaded stem 50 will, of course, pass through the opening 34 of the bearing portion 32 of the cutter member and the relatively thick body portion of the member 48 will provide a shoulder 52 which clamps the bearing portion 32 firmly against the lower surface of the mixing head 14. At the same time the planetary shaft hub 25 will project through the offset opening or portion 36 so that relative rotation between the cutter member 30 and the mixing head 14 is prevented. Thus the fastening member 48, which in this case is axially located, but could conceivably be at other points on the mixing head 14 serves the primary purpose of clamping and supporting the cutter member 30 without having to bear also the strain of coupling the cutter member to the head for rotation therewith. The necessary coupling is provided in this case by the interengagement between the shaft hub 25 and the offset opening 36. For convenience in manipulation, the attaching member 48 includes projecting finger pieces 54.

To assist in holding pieces of food in a position to be operated on by the cutting member, a feed or supply hopper 56 is provided. Hopper 56 is shown as a substantially tubular member having a bead 57 at its lower end and a similar bead 58 at its upper end. The lower end is substantially open as shown at 60 and one or more projections or flanges 62 may be formed on the hopper 56 extending radially inwardly to serve as a stop for the pusher member to be described.

The hopper 56 includes supporting means adapted to cooperate with the attachment recess or socket 28 on the casing 12 to fasten the hopper rigidly in position on the casing. In this case the supporting means is shown as a substantially horizontal bracket 64 having a split clamping ring 66 adapted to fit the hopper 56 just below the upper bead 58. At the point where the clamping ring portion 66 is split, there are radially projecting lugs 68 which may be forced toward and away from each other to tighten and loosen the clamping ring 66 by means of a threaded bolt 70 having finger portions 72.

The portion of bracket 64 which extends horizontally above the top 104 of casing 12 includes a post or bearing portion 74 having a vertical opening 75 through which an attaching bolt 76 may be threaded into the attachment socket 28 of the casing 12. This attaching bolt 78 includes finger pieces or wing nut portions 80 for convenience in manipulation. Since the attachment recess 28 is in a stationary part of casing 12, the hopper 56 will be rigidly and fixedly mounted on the mixer when the parts are in the position of Fig. 1.

For safety, the diameter and length of the hopper 56 are so chosen that it is impossible for the operator to insert a finger in the top of the hopper and have it reach as far as the cutting member at the lower end of the hopper. The choice of such relative proportions is well known in the art.

To assist in forcing the desired material against the cutting plate a pusher 82 is provided. This pusher includes an enlarged head or handle portion 84 and a lower food engaging face 86. The dimensions of the pusher are such that the lower face 86 will force all the particles of food against the cutting member 30 but will not itself engage the cutting member. Such engagement is prevented either by engagement of the lower face 86 with the radial stops 62 at the bottom of the hopper 56 or by engagement of the enlarged handle portion 84 with the upper beaded edge 58 of the hopper. Thus the food or other material 88 can be forced against the cutting plate 30 while the latter is rotated, without danger to the fingers of the operator from that portion of the cutter plate which is passing immediately adjacent the open lower end 60 of hopper 56.

To protect the operator from accidental engagement with the remaining portions of the cutting surface of member 30, a finger guard 90 is provided. In this case the guard 90 is shown as a substantially continuous circular plate having a slightly conical cross section similar to that of the cutter member 30. The outer periphery of the plate 90 is provided with a depending flange 92 which is beaded at 94.

For convenience the guard 90 is attached directly to hopper 56. For this purpose the plate 90 has an annular upstanding flange 96 providing an opening which just fits the supply hopper. Flange 96 may be attached to hopper 56 by welding, riveting, or other desired means.

As shown in Fig. 4, the finger guard plate 90 has a substantially central or axial opening 98 which is just large enough to permit the necessary portions of the mixer head 14 and planetary shaft hub 25 to project therethrough. Thus it is possible for the guard plate 90 to be located between the cutting member 30 and the casing 12 of the mixer. In the present case, because of the particular location of the supporting bracket 64 for hopper 56, one side of the opening 98 is substantially enlarged or extended as shown at 100. This enlarged portion 100 of the opening 98 is designed to facilitate removal of the hopper 56 and guard plate 90 from the mixer casing 12. As shown by the heavy lines in Fig. 4, the large portion 100 may have substantially the same width as the diameter of the circular center portion 98 so that, with bolt 78 removed, and after the cutter member 30 has been removed from mixing head 14, the supply hopper 56 and guard plate 90 may be drawn horizontally to the right in Fig. 1 until the edge 102 of bracket 64 clears the right hand end of the casing 12 to permit downward removal of the hopper and plate.

It is also possible to remove the hopper and guard plate by a pivotal or swinging movement, once the bolt 78 and the cutter member 30 have been removed. In this case, the left hand portion of plate 90 as shown in Fig. 1 would be swung downwardly and to the right using the point of engagement of edge 102 of bracket 64 with the top 104 of casing 12 as the center of rotation. In this case, the enlarged side portion 100 of opening 98 is large enough to clear the depending shaft hub 25 and beater clamp 26 so that the edge 108 may be swung in the direction indicated by the dotted line 110 until the plate 90 is clear of the planetary head, after which the hopper and guard plate may be removed laterally to the right in the figure.

To permit such pivotal or swinging movement for removal of the hopper and guard plate, it is not necessary that the enlarged portion 100 of opening 98 have the full width shown by the heavy lines in Fig. 4. It would only be necessary in such a case for the enlarged portion to have a diameter slightly greater than the diameter of the shaft hub 25 itself, so that the offset portion could be more narrowly tapered as shown by the dotted outline 106 of Fig. 4. In either case, however, the provision of this enlarged portion at the side of the central opening opposite the feed hopper 56 facilitates the attachment and removal of the hopper and guard plate.

The attachment and removal of the accessories will be apparent from the foregoing description. Thus, with the parts in position of Fig. 1, if it is desired to remove the accessory, the casing portion 12 would first be tilted upwardly in known manner to clear the bowl 10. It would then be possible to remove the fastening member 48 and cutting member 30 from the mixer head 14. Next the bolt 78 would be removed, permitting withdrawal of the hopper 56 and guard plate 90 in either of the paths described above, i. e., either by a horizontally sliding movement or by a pivotal or swinging movement followed by lateral displacement.

Similarly, to reattach the accessory to the casing 12, the reverse procedure would be followed. First, the hopper 56 and guard plate 90 would be swung or shifted into position so that the bolt 78 could be inserted to clamp these members rigidly in place. Then the cutter plate 30 would be placed against the lower surface of the mixing head 14 with the offset opening 36 engaging the planetary shaft hub 25, and the member 30 would then be clamped in this position by threading the member 48 into the axial recess of the planetary head.

If desired, it is possible according to the present invention to operate the grater or slicer simultaneously with operation of the planetary beater 112. For this purpose one can attach the beater 112 to the planetary shaft 24 by means of clamp 26 after the hopper 56, guard plate 90, and cutter and plate 30 have been mounted as described. In such a case, the device can be used for cutting or grating the material 88 directly into the mixing bowl 10 while at the same time the material in the bowl is mixed in any desired manner.

A construction has accordingly been provided by the present invention which makes it possible to utilize the mixing head of a planetary type mixer directly as the supporting and driving member for a food handling accessory. Where the accessory includes both movable and stationary portions, it is possible to mount the movable member on the planetary mixing head and support the stationary portion from another part of the mixing casing so that the two parts cooperate in the desired manner. With such a device it is also possible to achieve simultaneous operation of the accessory and the regular planetary beater of the mixer. Thus the structure accomplishes the objects of the present invention and provides an improved combination of household food mixer and food handling accessory.

In the form illustrated herein, the planetary head includes a projecting hub for the planetary beater shaft. Since the present invention might also be used (subject to certain disadvantages such as additional wear) with a planetary head in which only the rotating planetary shaft projects from the head, without such a fixed supporting hub, the term "planetary shaft portion" has been used in the claims to designate either the shaft itself or a supporting hub for such a shaft.

Since minor variations and changes in the exact details of construction will be apparent to persons skilled in this field, it is intended that this invention shall cover all such changes and modifications as fall within the spirit and scope of the attached claims.

Now, therefore, I claim:

1. In a food mixer of the type having a power casing, a mixing head mounted on the underside of the casing and rotatable on a vertical axis, and means on the casing spaced from the head for attachment of an accessory, the improvement comprising a substantially circular, plate-like food cutting member having a central bearing portion and a cutting surface extending therefrom with a plurality of spaced openings and portions providing cutting edges thereon, means rigidly attaching the bearing portion to the head for support and rotation of the cutting member by and with the head, said cutting surface extending laterally beyond said head and casing, a separate feed hopper having means cooperating with the attachment means on the casing and removably and rigidly mounting the hopper on the casing immediately above but free from supporting engagement with said cutting surface, said hopper having a feed passage adjacent the casing and above the cutting surface through which food may be fed downwardly against said cutting surface, with the cut portions of such food passing through the openings in said surface.

2. A food mixer according to claim 1 in which the hopper has a guard plate projecting therefrom between the casing and cutting member, said guard plate extending over the laterally extending portion of the cutting surface, thereby preventing undesired contact with the upper side of said cutting surface.

3. A food mixer according to claim 2 having a bowl located beneath the mixing head to receive a beater carried by said head when the power casing is in normal mixing position, the cutting surface of said cutting member extending laterally beyond the head and casing in an area above said bowl and thereby providing for passage of said cut portions of food downwardly directly into said bowl during operation of said cutting member, and said guard plate having at its outer periphery a depending flange projecting into the bowl around the cutting member.

4. A food mixer according to claim 1 in which the mixing head has a depending planetary beater drive shaft rotatable on an axis offset from that of the head, and in which the food cutting member has an offset opening through which said planetary shaft projects, engagement of the planetary shaft with the edges of the cutting member opening insuring rotation of the cutting member with the head.

5. A food mixer according to claim 1 in which the attachment means is located on the top of the casing, the cutting surface extends substantially horizontally from the bearing portion, and the feed hopper extends generally vertically adjacent the casing.

6. A food mixer according to claim 5 in which the hopper has, at its upper end, a bracket extending above the casing and, at its lower end, a guard plate projecting horizontally between the casing and cutting surface and substantially covering the latter, the plate having a central opening through which the head and planetary shaft extend, and one side of the opening being enlarged for clearing the shaft when the plate swings downwardly with the hopper bracket engaging the top of the casing during removal of the hopper.

7. A greater attachment for use with a food mixer of the type having a power casing with a rotating head of substantially spherical contour projecting from its undersurface and also having a planetary beater shaft portion on the head with its axis offset from the axis of rotation of the head, said attachment comprising a circular cutting plate having a spherical central bearing portion fitting the head and an outer cutting portion, said plate having an offset opening through which the planetary beater shaft portion may project, and means for attachment of the bearing portion to the head.

8. A greater attachment according to claim 7 in which the outer cutting portion is of relatively flat conical section.

References Cited in the file of this patent

UNITED STATES PATENTS

| | | |
|---|---|---|
| 126,116 | Weed | Apr. 23, 1872 |
| 1,296,108 | Oehler | Mar. 4, 1919 |
| 1,847,227 | Ringwald | Mar. 1, 1932 |
| 1,862,181 | Emmons | June 7, 1932 |
| 2,014,712 | Anderson et al. | Sept. 17, 1935 |
| 2,046,784 | Krause | July 7, 1936 |
| 2,113,916 | Goldblatt et al. | Apr. 12, 1938 |
| 2,185,155 | Meeker et al. | Dec. 26, 1939 |
| 2,262,912 | Behar | Nov. 18, 1941 |
| 2,411,333 | Orland | Nov. 19, 1946 |

FOREIGN PATENTS

| | | |
|---|---|---|
| 263,007 | Italy | Mar. 1, 1929 |